Patented Dec. 15, 1931

1,836,264

UNITED STATES PATENT OFFICE

JOHN D. McBURNEY AND EDGAR H. NOLLAU, OF NEWBURGH, NEW YORK, ASSIGNORS TO E. I. DU PONT DE NEMOURS & COMPANY, OF WILMINGTON, DELAWARE, A CORPORATION OF DELAWARE

PREVENTION OF LIVERING IN PIGMENTED CARBOHYDRATE-COMPOUND COMPOSITIONS

No Drawing.   Application filed October 5, 1926.   Serial No. 139,758.

This invention relates to the prevention and overcoming of livering in pigmented carbohydrate-compound compositions. Particularly it relates to nitrocellulose coating compositions containing metallic powder, such as "bronze" powder as a pigment, (such bronze powder as understood, of course, including metal flake material such as brass, zinc, aluminum, etc.). It is not, however, confined to nitrocellulose compositions or to bronze powder, since the basic features thereof are applicable to cellulose ethers, to other cellulose esters, as cellulose acetate, and indeed to other carbohydrate esters, as starch acetate, and to other pigments having a tendency to promote livering, such as Vandyke brown, red oxide of iron, iron blues, chrome yellow, combination of iron blue-chrome yellow pigments, etc. For the sake of definiteness of description, particular reference is made to nitrocellulose compositions containing metallic powder.

In the art of nitrocellulose coating compositions, particularly those containing bronze powder, there is great difficulty experienced due to livering or gelling of the compositions. As referred to in Worden's "Nitrocellulose Industry," 1911 edition, page 389, "It is a peculiar fact that in the manufacture of bronze-containing coating formula, the alloy must be incorporated with the pyroxylin but a few hours before using, for upon standing gelatinization of the entire mass occurs, and the mass can not again be brought into a satisfactory state of solution."

We have now found that not only can compositions be prepared which will not liver, but further we have found that already livered compositions can be brought back to proper condition, that is, de-livered. It is a major object of the invention to provide non-livering compositions of the general character indicated. It is a further object to provide a method for preventing the livering of pigmented carbohydrate-compound compositions, and a method for de-livering such compositions. It is a yet further object to provide pigment mixtures which, when added to carbohydrate-compound compositions, will give compositions which will not liver. To these ends and also to improve generally upon compositions, methods, and mixtures of the character indicated, our invention consists in the various matters hereinafter described and claimed.

We have found that livering is caused by an improper hydrogen ion concentration of the composition. In accordance with the invention, then, there is used in the composition a substance having such a dissociation constant that the hydrogen ion concentration of the composition is held within proper limits. Generally speaking, the range of hydrogen ion concentration which will fully inhibit livering may be said to be developed by those acids whose (primary) dissociation constant (represented by $P_{Ka}$) lies between 2.0 and 4.7. The quantity of hydrogen ions developed by the secondary or tertiary dissociation of polybasic acids may be ignored for practical purposes. The necessary hydrogen ion concentration is independent of the particular pigment, so that it is only in those cases wherein some property other than fluidity is in question that consideration need be given to what particular livering preventive is used with a particular pigment. For example, although acetic acid ($P_{Ka}=4.7$) is effective in preventing livering and in reliquefying bronze jellies, it is undesirable on account of the green color which is developed by the bronze pigment in the presence of acetic acid.

For the purpose of preventing, or overcoming, livering the amount of preventive is not important. That is to say, it is important to use a preventive (e. g. an acid) having a dissociation constant within the specified range but the effect obtained is, for practical purposes, not dependent on the amount of the acid that is used. Even though there be a point of extreme dilution where increasing amounts would have better effects, yet this point would correspond to such small amounts of preventive that they would not be practical amounts to work with in factory or even laboratory operations. Still, for practical reasons, it is desirable to use at least such an amount of preventive that the preventive may be mixed into a specified amount of solution quickly, since if too little is used it will take a considerable time to distribute the preventive properly throughout the mass. Conversely, if an unduly large amount of preventive is used it might be that this amount would have a deleterious effect on the composition as a whole, or on the pigment. Generally speaking, and in view of these and other considerations, we prefer to use substantially between .1 to 5%, preferably substantially between .2 and 3% of preventive, based on the total weight of the (untreated) composition to be protected or to be reliquefied; but as indicated above, so far as the effect of the preventive as such is concerned, the amount may be much less than .2%, and a material excess is not detrimental.

By way of example, but not in limitation, a composition in accordance with the invention may be (parts by weight):—

| | |
|---|---|
| Cellulose nitrate | 8.5 |
| Tricresyl phosphate | 20.0 |
| Gold bronze | 17.5 |
| Ethyl acetate | 31.5 |
| Benzol | 60. |
| Preventive | .1375 to 6.875 |

It will be understood that the above formula may be greatly varied, it, in fact, merely exemplifying a proper coating composition plus .1 to 5% of preventive based on the total weight (137.5) of the coating composition proper. The preventive may be any substance having the proper dissociation constant ($P_{Ka}$ between and including 2.0 and 4.7) and compatible with the pigment and so on, as explained above; for example, tartaric, citric or malic acid.

While the above composition includes tricresyl phosphate as a softener and has cellulose nitrate as a base, it, as before indicated, is to be understood that the invention is not confined to compositions of this particular character. Thus, the softener can be any other or, in fact, and so far as the present invention is concerned, be wholly omitted; and the base of the composition may be other than nitrocellulose, as cellulose acetate, cellulose ether, etc. For example, for the cellulose nitrate, tricresyl phosphate and ethyl acetate-benzol might be substituted equal numbers of parts of cellulose acetate, triacetin, and acetone.

The invention is equally applicable to the preventing of livering in compositions as originally made up, and to the full de-livering, and subsequent prevention of the livering of, compositions that have livered. In both cases the same preventives in the same percentages may be used. Then, assuming the above composition (without the preventive) to have livered, it can be reliquefied, that is restored from the gel phase to the sol phase, by mixing into it the stated percentage of the preventive. In preventing livering (that is stabilizing the sol phase) a solution of the preventive, say an alcoholic solution where the preventive is soluble in alcohol and alcohol compatible with the composition, may be added to the composition. In reliquefying livered material (moving the equilibrium from gel to sol phase) the introduction of the preventive in an active solvent for the base material, e. g. nitrocellulose, is preferable. These are, of course, but desirable suggestions, and the preventive can be added, in either case, in any desired way resulting in a proper dispersion thereof in the composition.

Returning to the preventives desirable to be used in the practices of the invention, many will suggest themselves to those skilled in the art. Below we give certain ones (desirable except boric acid) together with the results of tests therewith. The primary dissociation constants are as given by Heywood Scudder in "Conductivity and Ionization Constants of Organic Compounds", Van Nostrand, New York, 1914, or by Mansfield Clark in "The Determination of Hydrogen Ions", Williams and Wilkins, Baltimore, 1925. The viscosities are those obtained by the introduction of equimolecular quantities of the preventive in a pyroxylin- (castor) oil-bronze dispersion.

| Peptizing agent | Ref. Scudder page | Ka at 25° C. | $P_{Ka}$ | Visc. (centipoises) |
|---|---|---|---|---|
| Control | | | | Livered |
| Oxalic acid | 239 | $10 \times 10^{-2}$ | 1.0 | 98,260 |
| Phosphoric acid | 462 (Clark) | $1 \times 10^{-2}$ | 2.0 | 12,920 |
| Tartaric acid | 284 | $9.7 \times 10^{-4}$ | 3.1 | 920 |
| Citric acid | 108 | $8.2 \times 10^{-4}$ | 3.1 | 850 |
| Malic acid | 195 | $4.0 \times 10^{-4}$ | 3.4 | 4,760 |
| Formic acid | 163 | $2.91 \times 10^{-4}$ | 3.7 | 14,000 |
| Acetic acid | 43 | $1.8 \times 10^{-5}$ | 4.7 | 147,900 |
| Boric acid | 462 (Clark loc. cit.) | $6.5 \times 10^{-10}$ | 9.2 | Livered |

In the above, $P_{Ka}$ is, of course, $\log \frac{1}{K_a}$.

When but temporary improvement only is necessary, substances may be used which have a $P_{Ka}$ value as low as 1.0. This is illustrated specifically in the case of oxalic acid ($P_{Ka}=1.0$) with which a temporary retardation of livering may be effected and a partial reliquefaction of the livered material realized. In view of this, although for simplicity reference is made in the claims to "non-livering" compositions, "preventive" of livering, etc., it is to be understood that such terms are not to be taken as limited to compositions which are fully non-livering unless clearly so indicated.

It has further been found that the invention may be practiced by the addition of the various preventives to the pigment, e. g. bronze pigment itself. This gives a pigment composition which, when used in making up coating compositions, etc., will give a composition which will not liver. In making such a pigment mixture it is merely necessary to mix with the pigment such an amount of preventive as will be at least sufficient to give, say, between .1 and 5%, based on the total weight of the composition (plus the pigment), of any clear composition into which the pigment is likely to be mixed in practical use. That is, taking the above formulated composition of cellulose nitrate 8.5, tricresyl phosphate 20, ethyl acetate 31.5 and benzol 60 as generally representative of clear compositions, and gold bronze 17.5 as the approximate amount that would commonly be added, gold bronze having mixed therewith, .1375 to 6.875 parts of preventive per 17.5 parts of pigment may be used for pigmenting such compositions, and, indeed, for compositions widely varying from that specified.

Although particular reference has been made to acids as preventives, it is to be understood that other substances resulting in the development of the proper hydrogen ion concentration can be used.

We claim:

1. A non-livering coating composition comprising a cellulose derivative, a metallic pigment, and an acid having a primary dissociation constant between about 2.0 and 4.7 in an amount sufficient to prevent livering of the composition and not sufficient to deleteriously affect the composition as a whole, or the pigment.

2. A non-livering coating composition comprising a cellulose derivative, a pigment from the group consisting of bronze powder, Vandyke brown, red oxide of iron, iron blues, chrome yellow, and a combination iron blue-chrome yellow, and an acid having a primary dissociation constant between about 2.0 and 4.7 in an amount sufficient to prevent livering of the composition and not sufficient to deleteriously affect the composition as a whole, or the pigment.

3. A non-livering coating composition comprising a cellulose derivative, a metallic pigment, and an acid of the group consisting of phosphoric, tartaric, citric, malic, and formic acids, in an amount sufficient to prevent livering of the composition and not sufficient to deleteriously affect the composition as a whole, or the pigment.

4. A non-livering coating composition comprising cellulose nitrate, a metallic pigment, and an acid having a primary dissociation constant between about 2.0 and 4.7 in an amount sufficient to prevent livering of the composition and not sufficient to deleteriously affect the composition as a whole, or the pigment.

5. A non-livering coating composition comprising cellulose nitrate, a pigment from the group consisting of bronze powder, Vandyke brown, red oxide of iron, iron blues, chrome yellow, and a combination iron blue-chrome yellow, and an acid having a primary dissociation constant between about 2.0 and 4.7 in an amount sufficient to prevent livering of the composition and not sufficient to deleteriously affect the composition as a whole, or the pigment.

6. A non-livering coating composition comprising cellulose nitrate, a metallic pigment, and an acid of the group consisting of phosphoric, tartaric, citric, malic, and formic acids, in an amount sufficient to prevent livering of the composition and not sufficient to deleteriously affect the composition as a whole, or the pigment.

7. A non-livering coating composition comprising cellulose nitrate, a pigment from the group consisting of bronze powder, Vandyke brown, red oxide of iron, iron blues, chrome yellow, and a combination iron blue-chrome yellow, and an acid from the group consisting of tartaric, citric, and malic acids, in an amount sufficient to prevent livering of the composition and not sufficient to deleteriously affect the composition as a whole, or the pigment.

8. A non-livering coating composition comprising a cellulose derivative, a metallic pigment, and an acid having a primary dissociation constant between about 2.0 and 4.7 in an amount between 0.1 and 5.0% by weight of the total weight of the composition excluding the acid.

9. A non-livering coating composition comprising cellulose nitrate, a metallic pigment, and an acid having a primary dissociation constant between about 2.0 and 4.7 in an amount between 0.1 and 5.0% by weight of the total weight of the composition excluding the acid.

10. A non-livering coating composition comprising cellulose nitrate, a pigment from the group consisting of bronze powder, Vandyke brown, red oxide of iron, iron blues, chrome yellow, and a combination iron blue-chrome yellow, and an acid from the group consisting of tartaric, citric, and malic acids, in an amount between 0.1 and 5.0% by weight of the total weight of the composition excluding the acid.

In testimony whereof we affix our signatures.

JOHN D. McBURNEY.
EDGAR H. NOLLAU.